United States Patent [19]

Hinz et al.

[11] Patent Number: 5,685,150
[45] Date of Patent: Nov. 11, 1997

[54] PRESSURE REGULATOR FOR HYDRAULIC BRAKE WITH SLIP CONTROL

[75] Inventors: Axel Hinz, Neu-Anspach; Edwin Czarnetzki, Elz, both of Germany

[73] Assignee: ITT Automotive Europe GmbH, Frankfurt, Germany

[21] Appl. No.: 687,398

[22] PCT Filed: Jan. 25, 1995

[86] PCT No.: PCT/EP95/00267

§ 371 Date: Aug. 2, 1996

§ 102(e) Date: Aug. 2, 1996

[87] PCT Pub. No.: WO95/21082

PCT Pub. Date: Aug. 10, 1995

[30] Foreign Application Priority Data

Feb. 4, 1994 [DE] Germany ............. 44 03 466.0

[51] Int. Cl.⁶ .................. B60T 13/00; F01B 1/00
[52] U.S. Cl. ....................... 60/547.1; 92/161
[58] Field of Search ............. 60/597.1; 92/161; 91/376 R

[56] References Cited

U.S. PATENT DOCUMENTS

| | | | |
|---|---|---|---|
| 3,175,235 | 3/1965 | Randol | 92/161 X |
| 3,606,756 | 9/1971 | Hellmann | 60/547.1 X |
| 4,826,121 | 5/1989 | Rossigno et al. | 92/161 X |
| 5,022,717 | 6/1991 | Heibel et al. | |
| 5,331,813 | 7/1994 | Heibel | 60/547.1 |

FOREIGN PATENT DOCUMENTS

| | | |
|---|---|---|
| 0356817A1 | 3/1990 | European Pat. Off. |
| 0366966A1 | 5/1990 | European Pat. Off. |
| 0356817B1 | 7/1990 | European Pat. Off. |
| 0456991A1 | 11/1991 | European Pat. Off. |
| 3928059C1 | 11/1980 | Germany |
| 3837419A1 | 5/1990 | Germany |
| 3941401C1 | 1/1991 | Germany |
| 4013159A1 | 10/1991 | Germany |
| 4107625A1 | 9/1992 | Germany |

OTHER PUBLICATIONS

PCT Application Serial No. 89/01434 Dated Feb. 23, 1989.
PCT Application Serial No. 93/02901 Dated Feb. 18, 1993.

Primary Examiner—Hoang Nguyen
Attorney, Agent, or Firm—Thomas N. Twomey; J. Gordon Lewis

[57] ABSTRACT

A pressure control device for slip-controlled hydraulic brake systems includes a brake pressure transducer that cooperates with an auxiliary pressure system, a reservoir for supplying the brake pressure transducer and the auxiliary pressure system with the pressure medium, wherein the auxiliary pressure system is connected to a pressure modulator that includes several hydraulic valves and storage elements, and a control electronic for actuating the auxiliary pressure system. The auxiliary pressure system is formed by structurally combining an electric motor and an auxiliary pressure pump so as to attain a motor/pump unit that accommodates the pressure modulator. A multipoint suspension is arranged on the hydraulic unit formed of the electric motor, the auxiliary pressure pump and the pressure modulator, with said multipoint suspension being exclusively connected to a holding device via elastically deformable damping elements in such a way that the housing of the electric motor (1) is isolated from the holding forces of the multipoint suspension.

5 Claims, 2 Drawing Sheets

PRESSURE REGULATOR FOR HYDRAULIC BRAKE WITH SLIP CONTROL

FIELD OF THE INVENTION

The invention pertains to a pressure control device for slip-controlled hydraulic brake systems and more specifically to mounting systems thereof.

BACKGROUND OF THE INVENTION

EP 0,356,817 B1 discloses a pressure control device for slip-controlled hydraulic brake systems. In a first embodiment, the pump unit that is combined with the pressure modulator is fastened on both tie rods of the pneumatic power booster. For this purpose, one end face of the pressure modulator is provided with a holding lug for fastening the first tie rod in the holding lug via damping elements. The second tie rod also engages in a holding lug of a holding part that consists of flat steel and is fastened to the cover of the electric motor. In one additional embodiment, the holding part of flat steel which is fastened to the end surface of the housing of the electric motor is, in contrast to the first embodiment, not fastened on the tie rods, but rather a holding screw of the master cylinder. In a third embodiment, a holding device formed of two holding bolts and one flange is provided on the hydraulic unit as a multipoint suspension, with said holding device being fastened on both tie rods between the master cylinder and the pneumatic power booster. The hydraulic unit is screwed to the holding device inside the damping elements arranged in the suspension by means of a strap that encompasses the housing of the electric motor as well as a holding lug that is integrally formed on the end surface region of the pressure modulator.

All previously described suspensions of the hydraulic unit on the power booster or the master cylinder are associated with increased manufacturing expenditures, namely because the hydraulic unit needs to be provided with correspondingly complicated holding lugs and the separate retention on the end surface of the electric motor requires a particularly rigid motor housing. In addition, it is possible that distortions occur during the mounting of the hydraulic unit on the power booster or the master cylinder. Consequently, the structural volume and the weight are significantly increased.

SUMMARY OF THE INVENTION

The invention is based on the objective of developing a pressure control device for slip-controlled hydraulic brake systems that allows a simple and inexpensive fastening of the hydraulic unit on the brake pressure transducer as well as a standardization of the suspension points for all housing variations of the hydraulic unit and ensures a simple, optimal vibration damping between the hydraulic unit and the holding device, wherein the housing of the electric motor is alleviated from all holding forces.

According to the invention, this objective is attained with the characteristics disclosed in the characterizing portion of claim 1, according to which a multipoint suspension is arranged on the hydraulic unit, with said multipoint suspension being exclusively connected to a holding device via elastically deformable damping elements in such a way that the housing of the electric motor is alleviated from the holding forces of the multipoint suspension.

These measures ensure that the number of individual components required is kept to a minimum, and that a standardization with respect to the uniformity of the holding points is attained. The housing of the electric motor can be correspondingly short and have thin walls. In addition, a standardization of the brake line connections is provided for identical holding devices.

Additional characteristics and advantages of the invention are described below with reference to the constructive embodiments shown in the figures.

DETAILED DESCRIPTION OF PREFERRED EMBODIMENTS

Figure 1:
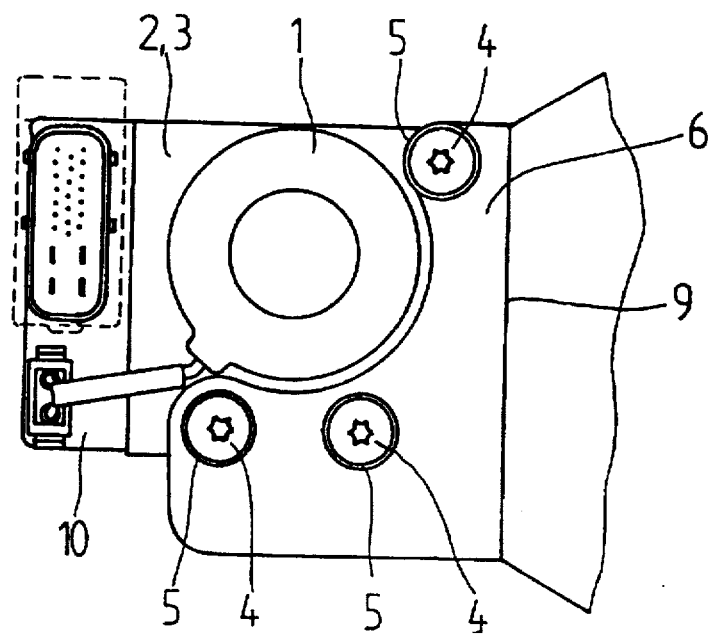
FIG. 1 is a top view one basic embodiment of the arrangement of a multipoint suspension on a hydraulic unit.
Figure 5:
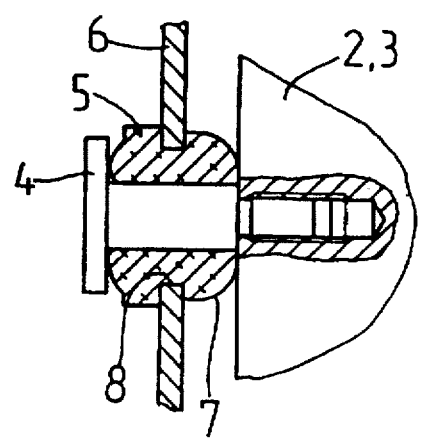
FIG. 5 is a sectional view of one embodiment of the arrangement for fastening the damping elements used in FIGS. 1-4.

FIG. 1 shows a simplified top view of the hydraulic unit formed of an electric motor 1, an auxiliary pressure pump 2 and a pressure modulator 3. The electric motor 1 is arranged on one end surface of this hydraulic unit. This end surface forms the flanged surface for accommodating the multipoint suspension 4 that is illustrated in the form of three holding screws which are distributed over the circumference of the housing of the electric motor 1 in the example shown. These holding screws form a three-point suspension for the essentially plate-shaped holding device 6 that only needs to partially encompass the housing of the electric motor 1. Damping elements 5 that are discussed in detail below in connection with FIG. 5 are arranged between the holding screws that form the three-point suspension and the holding device 6.

In order to correspondingly adapt the holding device or bracket 6 to the periphery, said holding device 6 is provided with a right-angle bend 9. If this right-angle bend is correspondingly shaped, e.g., creased, the rigidity of the holding device is increased and the vibration damping is improved. Sufficient space for arranging the control electronic 10 required for controlling the hydraulic valves situated in the pressure modulator 3 remains on the lateral surface of the hydraulic unit which faces away from the encompassed holding region. This figure shows that the auxiliary pressure pump 2 and the hydraulic valves of the pressure modulator 3 are integrated into a block-shaped housing such that a particularly compact design is attained. Due to the proposed arrangement of only one multipoint suspension 4 that is centrally arranged on the flanged side of the electric motor, the entire system is additionally miniaturized. The multipoint suspension 4 consequently can be realized in the form of a standardized hole pattern on the free flanged surface of the hydraulic unit, wherein the pin connection of the block-shaped housing as well as the receptacle bore for the electric motor 1 can be inexpensively realized in only one production step. Consequently, the suspension and retention of the hydraulic unit only requires the arrangement of three damping elements 5 in the holding device 6 and the insertion of holding screws in one assembly plane so as to fasten the hydraulic unit on the holding device 6.

Figure 2:
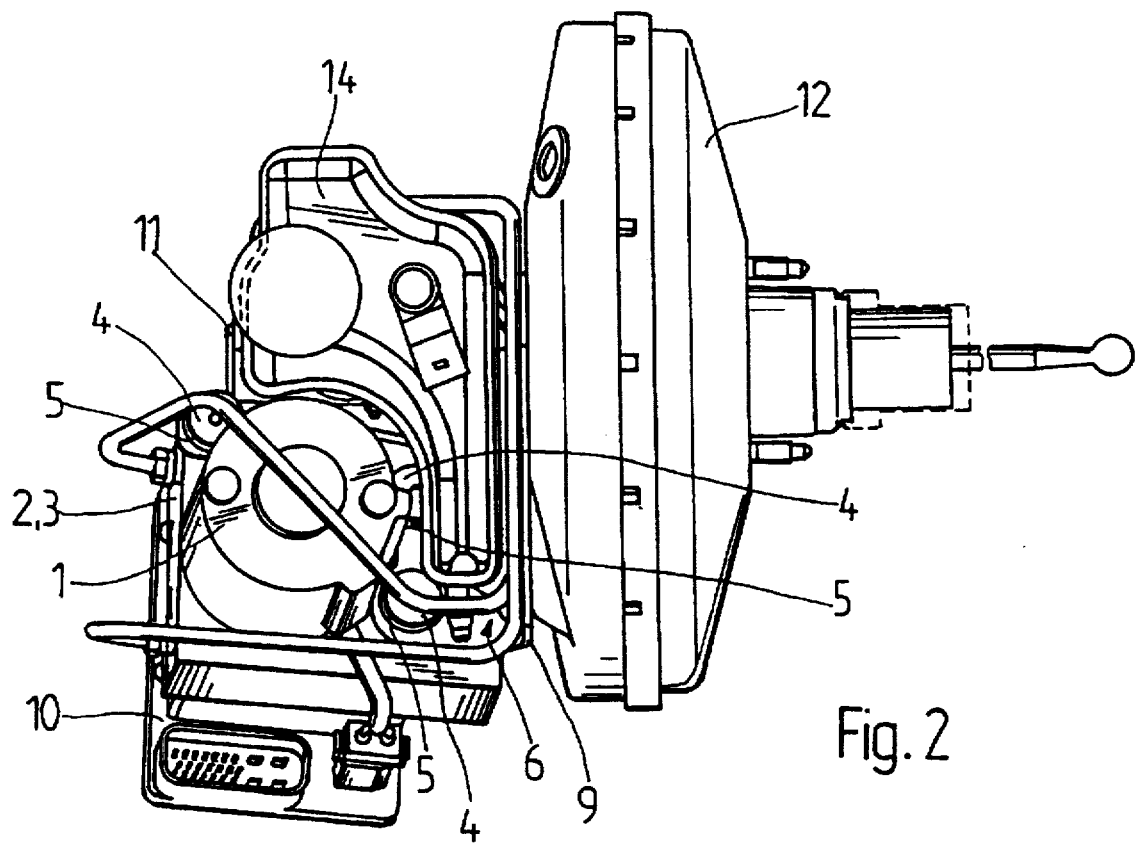
FIG. 2 is a top perspective representation of a pressure control device with a concrete embodiment of the arrangement for suspending the hydraulic unit on the brake pressure transducer.

FIG. 2 shows an entire pressure control device with a holding device 6 that is essentially bent at a right angle. This figure also shows the multipoint suspension on the hydraulic unit which is realized in the form of a three-point suspension. The hydraulic unit is fastened laterally on the master cylinder 11 and the pneumatic power booster 12 by means of the holding device 6. The holding device 6 represents a unit that is preassembled on the hydraulic unit 2,3 and clamped between the two components of the brake pressure transducer before the assembly of the master cylinder 11 and the power booster 12. The holding device 6 is preferably punched out of a thin sheet metal part that can be shaped in a relatively simple fashion and results in a particularly rigid, lightweight and small holding device that can be tightly arranged on the master cylinder 11. The reservoir 14 of the master cylinder, which is shown in the top view, has a shape that is adapted to the housing of the electric motor and simplifies the arrangement of the hydraulic unit.

Figure 3:
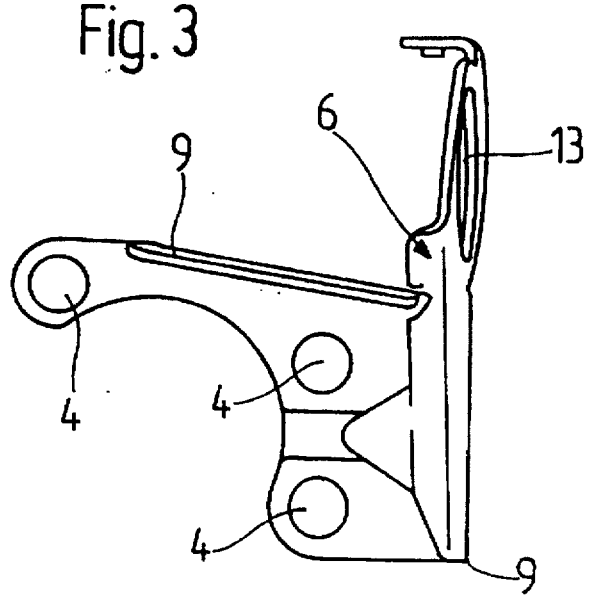
FIG. 3 is a top view of a holding device for fastening the hydraulic unit on the brake pressure transducer according to FIG. 2.

FIG. 3 shows a holding device 6 that can be used for the pressure control device according to FIG. 2 in the form of a perspective representation. This figure clearly shows the three holding lugs for accommodating the damping elements 5 as well as the special shape of the rigid, lightweight and small holding body which is attained due to the special shaping, namely bending at a right angle and creasing. The section of the holding device 6 which is clamped between the master cylinder 11 and the power booster 12 is provided with a correspondingly large through-opening 13 through which the plunger rod can be passed as well as sealing the pneumatic power booster 12 against the atmosphere. This through-opening accommodates a seal, which is not shown in the figure. The arrangement of the holding part between the tandem master cylinder and the booster requires no additional fastening elements. In this case, the thickness of the seal is chosen such that the seal projects from the holding device within the region of the through-opening 13 to such an extent that a deformation of the seal which produces the required sealing force is attained when the nut on the power booster is tightened to the thickness of the holding device 6. Due to the insertion of this seal into the through-opening 13, the otherwise required production steps on the master cylinder 11 are eliminated. The machining of a groove into the master cylinder for accommodating the seal is no longer required. In this respect, we refer to the thus far required arrangement of a flange for accommodating the seal.

Figure 4:
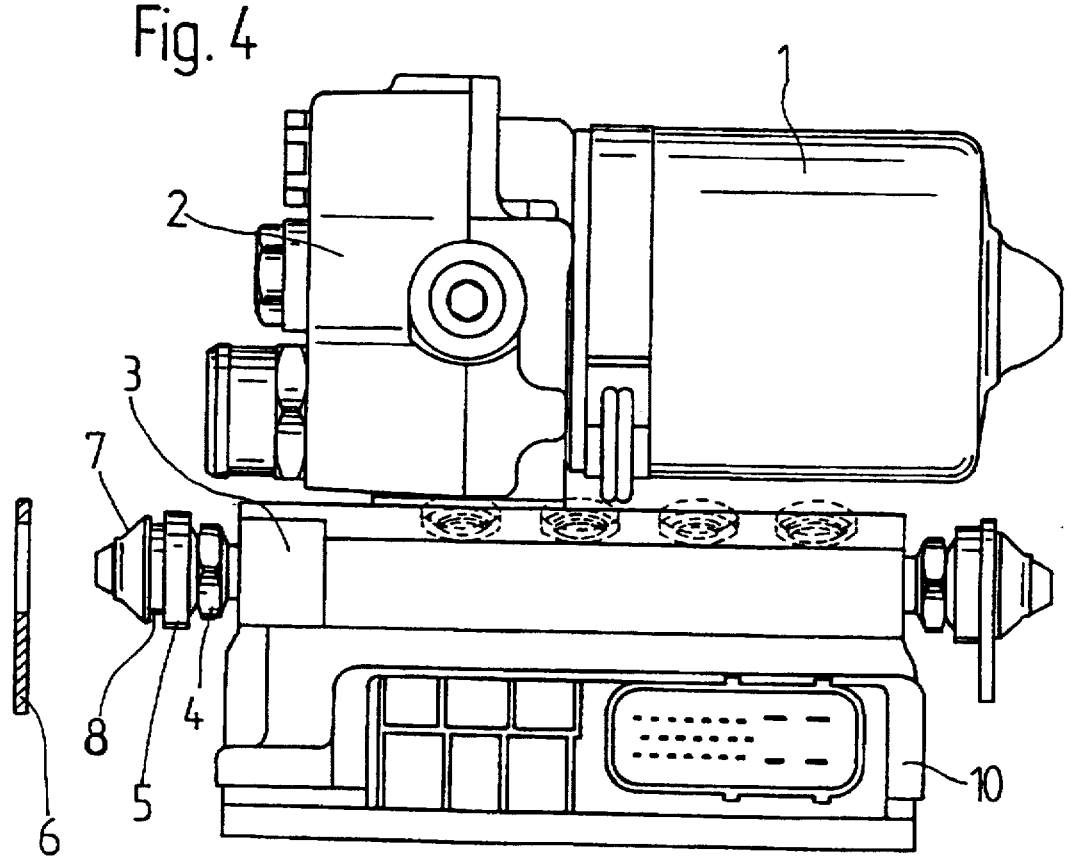
FIG. 4 is a top view of an alternative embodiment of the arrangement of the suspension points.

FIG. 4 shows one additional embodiment of the multipoint suspension in which a pressure modulator 3 is separately flanged onto the auxiliary pressure pump 2. The essentially block-shaped pressure modulator 3 is provided with bolts that fulfill the function of the multipoint suspension 4 on two opposing lateral surfaces. The damping elements 5 are either preassembled in the plate-shaped holding device 6 or on the holding bolt. The damping elements 5 are provided with a chamfer 7 in the insertion direction so as to simplify the mounting in the holding device 6. The holding bolts are also chamfered. The damping elements 5 are held in the holding device 6 in a nonpositive fashion by means of their groove 8.

FIG. 5 shows an enlarged representation of the connection between the holding device 6 and the multipoint suspension 4, which is schematically illustrated in FIGS. 1 and 2 and can also be used in the arrangement according to FIG. 4. The holding device 6 is already inserted into the groove 8 of the damping element 5 via the chamfer 7, i.e., only the multipoint suspension 4, which is realized in the form of a collar screw, needs to be screwed into the corresponding blind hole in the hydraulic unit 2,3. Any arbitrary installation position in which radial, as well as axial, loads occur is permissible.

The previously described embodiments disclose practical solutions that are characterized by surprisingly simple means which, with respect to a reduction of the structural volume, the weight and the number of required components, ensure an optimal and standardizable fastening of the hydraulic unit. needs to be screwed into the corresponding blind hole in the hydraulic unit 2,3. Any arbitrary installation position in which radial, as well as axial, loads occur is permissible.

The previously described embodiments disclose practical solutions that are characterized by surprisingly simple means which, with respect to a reduction of the structural volume, the weight and the number of required components, ensure an optimal and standardizable fastening of the hydraulic unit.

LIST OF REFERENCE NUMERALS

Electric motor
Auxiliary pressure pump
Pressure modulator
Multipoint suspension
Damping elements
Holding device
Chamfer
Groove
Right-angle bend
Control electronic
Master cylinder
Power booster
Through-opening
Reservoir

We claim:

1. A mounting system for fixing a motor/pump unit to a master cylinder of a slip-controlled hydraulic brake system comprising:

a hydraulic unit including an electric motor and an auxilliary pump to which the electric motor is drivingly attached;

a master cylinder and power booster assembly;

a bracket rigidly fixed to one of the motor/pump unit and the master cylinder and power booster assembly with the bracket having a plurality of openings;

a plurality of elastically deformable damping elements with one being disposed in each of the openings in the bracket; and a plurality of fasteners with one passing through each of the damping elements connecting each of the damping elements to the other of the motor/pump unit and the master cylinder and power booster assembly.

2. A mounting system as claimed in claim 1 wherein the bracket is rigidly fixed to the master cylinder and power booster assembly and the elastically deformable elements are connected to the hydraulic unit by the fasteners.

3. A mounting system as claimed in claim 1 wherein the damping elements have a chamfer facilitating entry into the openings and also have a circumferential groove sized to facilitate their retention in the openings.

4. A mounting system as claimed in claim 2 wherein the bracket has a right-angle bend between where it is fixed to the master cylinder and power booster assembly and a portion of the bracket having the openings in the bracket which receive the damping elements.

5. A mounting system as claimed in claim 2 wherein the bracket is clamped between the master cylinder and the power booster.

* * * * *